(12) United States Patent
Chen et al.

(10) Patent No.: US 8,995,250 B2
(45) Date of Patent: Mar. 31, 2015

(54) PAGING PROCESSING METHOD AND SYSTEM, SERVING GATEWAY

(71) Applicant: Huawei Technologies Co., Ltd., Shenzhen (CN)

(72) Inventors: Zhongping Chen, Shanghai (CN); Wenfu Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 110 days.

(21) Appl. No.: 13/790,885

(22) Filed: Mar. 8, 2013

(65) Prior Publication Data

US 2013/0188474 A1  Jul. 25, 2013

Related U.S. Application Data

(63) Continuation of application No. PCT/CN2010/076733, filed on Sep. 8, 2010.

(51) Int. Cl.
*H04L 12/26* (2006.01)
*H04W 24/04* (2009.01)
*H04W 68/00* (2009.01)
*H04W 36/12* (2009.01)
*H04W 76/02* (2009.01)

(52) U.S. Cl.
CPC .............. *H04W 24/04* (2013.01); *H04W 68/00* (2013.01); *H04W 36/12* (2013.01); *H04W 76/028* (2013.01)
USPC .......................................... 370/218; 370/216

(58) Field of Classification Search
None
See application file for complete search history.

(56) References Cited

FOREIGN PATENT DOCUMENTS

| CN | 1852537 A | 10/2006 |
|---|---|---|
| CN | 101540989 A | 9/2009 |
| CN | 101699861 A | 4/2010 |
| CN | 101730124 A | 6/2010 |
| CN | 101772114 A | 7/2010 |
| EP | 2495933 A1 | 9/2012 |
| WO | WO 2009/152861 A1 | 12/2009 |

OTHER PUBLICATIONS

Office Action issued in corresponding Chinese Patent Application No. 201080001880.4, mailed Apr. 24, 2013.
Written Opinion of the International Searching Authority issued in corresponding PCT Patent Application No. PCT/CN2010/076733, mailed Jun. 9, 2011.

(Continued)

*Primary Examiner* — Afshawn Towfighi
(74) *Attorney, Agent, or Firm* — Brinks Gilson & Lione

(57) ABSTRACT

The embodiments of the present invention provide a paging processing method and system and also a serving gateway. The paging processing method includes: detecting, by a serving gateway, a fault of a mobility management element, determining a type of the fault, and reselecting a mobility management element according to the type of the fault; and sending, by the serving gateway, a downlink data notification message to the reselected mobility management element, whereupon the reselected mobility management element sends a paging message to a user equipment UE that is served by the faulty mobility management element before the fault occurs. With the method, system and serving gateway provided in the embodiments of the present invention, user experience is improved effectively.

20 Claims, 12 Drawing Sheets

(56) References Cited

OTHER PUBLICATIONS

International Search Report issued in corresponding PCT Patent Application No. PCT/CN2010/076733, mailed Jun. 9, 2011.
LTE, "3rd Generation Partnership Project; Technical Specification Group Core Network and Terminals; Restoration Procedures" (Release 10) 3GPP TS 23.007. v10.0.0, Jun. 2010.
Extended European Search Report issued in corresponding European Patent Application No. 10847272.1, mailed May 14, 2013.
LTE, "3rd Generation Partnership Project; Technical Specification Group Core Network and Terminals; Mobility Management Entity (MME)—Visitor Location Register (VLR) SGs Interface Specification" (Release 10) 3GPP TS 29.118. V10.0.0, Jun. 2010.
Cisco, "Discussion on UE Mobility during MME Failure" Agenda Item 6.9, 3GPP TSG CT4 Meeting #50. Xi'an, P.R. China, Aug. 23-27, 2010. C4-102052.
Cisco, "Reestablishment of UE's Context after MME/S4-SGSN Node Failure" Change Request, 23.007 CR 0118, rev. 9.4.0. 3GPP TSG CT4 Meeting #50. Xi'an P.R. China, Aug. 23-27, 2010. C4-102054.
Cisco, "Reestablishment of UE's Context after MME/S4-SGSN Node Failure" Change Request, 29.274 CR 0728, rev. 9.3.0. 3GPP TSG CT4 Meeting #50. Xi'an P.R. China, Aug. 23-27, 2010. C4-102055.

US 8,995,250 B2

PAGING PROCESSING METHOD AND SYSTEM, SERVING GATEWAY

CROSS-REFERENCE TO RELATED APPLICATIONS

This application is a continuation of International Application No. PCT/CN2010/076733, filed on Sep. 8, 2010, which is hereby incorporated by reference in its entirety.

FIELD OF THE INVENTION

The present invention relates to the field of communications technologies, and in particular, to a paging processing method and system, and a serving gateway.

BACKGROUND OF THE INVENTION

Currently, in an evolved packet network (EPS, Evolved Packet System), if an MME (Mobility Management Entity, mobility management entity) or an SGSN (Serving GPRS Support Node, serving GPRS support node) is faulty, the MME/SGSN may lose a context of the served UE (User Equipment, user equipment). In this case, if an SGW (Serving Gateway, serving gateway) perceives the fault of the MME/SGSN, the SGW may delete the context of the UE served by the faulty MME/SGSN. In this way, when receiving, from the PGW (Packet Data Network Gateway, packet data network gateway), downlink data about the UE served by the faulty MME/SGSN, the SGW may not reselect a mobility management element, may not be able to re-create a context for the UE, and may not provide services for the UE, which affects user experience.

SUMMARY OF THE INVENTION

In view of the above, embodiments of the present invention provide a paging processing method and system and also a serving gateway. After a mobility management element is faulty, the SGW reselects a mobility management element for a UE that is served by the faulty mobility management element before the fault occurs, and triggers the reselected mobility management element to page the UE, which further triggers the UE to initiate an attach process to re-create a context.

The present invention employs the following technical solutions:

A paging processing method includes:
detecting, by a serving gateway, a fault of a mobility management element, determining a type of the fault, and reselecting a mobility management element according to the type of the fault; and
sending, by the serving gateway, a downlink data notification message to the reselected mobility management element, whereupon the reselected mobility management element sends a paging message to a user equipment UE that is served by the faulty mobility management element before the fault occurs.

A serving gateway includes:
a determining and selecting unit, configured to detect a fault of a mobility management element, determine a type of the fault, and reselect a mobility management element according to the type of the fault; and
a sending unit, configured to send a downlink data notification message to the reselected mobility management element.

A paging processing system includes:
a serving gateway, configured to detect a fault of a mobility management element, determine a type of the fault, reselect a mobility management element according to the type of the fault, and send a downlink data notification message to the reselected mobility management element; and
a mobility management element, configured to receive the downlink data notification message from the serving gateway, and send a paging message to a UE that is served by the faulty mobility management element before the fault occurs.

With the paging processing method and system as well as the serving gateway provided in the embodiments of the present invention, in a scenario where a mobility management element is faulty, an SGW reselects a mobility management element for a UE served by the faulty mobility management element before the fault occurs, and triggers the reselected mobility management element to page the UE, which further triggers the UE to initiate an attach process to re-create a context, thereby ensuring user experience.

DETAILED DESCRIPTION OF THE EMBODIMENTS

Figure 1:
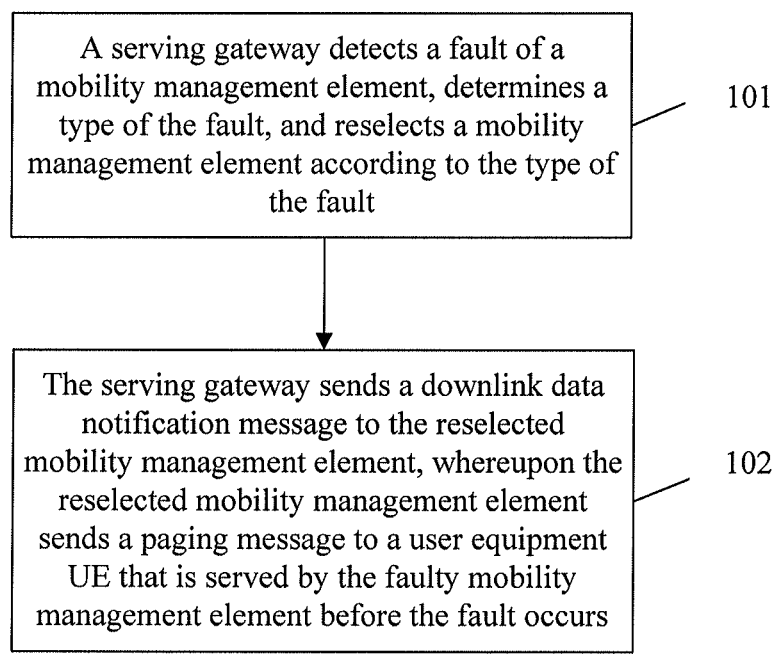
FIG. 1 is a flowchart of a paging processing method according to Embodiment 1 of the present invention.

FIG. 1 is a flowchart of a paging processing method according to Embodiment 1 of the present invention. As shown in FIG. 1:

101. A serving gateway detects a fault of a mobility management element, determines a type of the fault, and reselects a mobility management element according to the type of the fault.

The types of fault of the mobility management element (for example, MME or SGSN) include restart success and fault non-recovery. The SGW perceives and determines the restart success and the fault non-recovery of the mobility management element in the following way:

1) The SGW perceives and determines the restart success of the mobility management element in the following way:

The SGW sends an Echo Request message to the mobility management element; after receiving the Echo Request message, the mobility management element returns an Echo Response message to the SGW, where the message carries restart counter information; according to the received restart counter information, the SGW detects that the mobility management element is restarted successfully; or The mobility management element sends an Echo Request message to the SGW when being restarted, where the message carries restart counter information; the SGW detects, according to the received restart counter information, that the mobility management element is restarted successfully.

At this time, the SGW may keep serving the UE that is served by the mobility management element before the restart, without deleting a context of the UE; besides, because the UE context stored in the SGW includes address information (IP address) of the mobility management element that serves the UE, the SGW may retrieve the affected UE according to the address information (IP address) of the mobility management element when the mobility management element is restarted.

2) The SGW perceives and determines the fault non-recovery of the mobility management element in the following way:

The SGW sends an Echo Request message to the mobility management element, and receives no Echo Response message after a response times out; at this time, the SGW may choose to re-send an Echo Request message to the mobility management element. If no Echo Response message is received after the sending is repeated several times, the SGW determines that a link to the mobility management element is unavailable, and determines that the mobility management element has not recovered from the fault.

At this time, the SGW may keep serving the UE that is served by the faulty mobility management element before the fault occurs, without deleting a context of the UE; besides, because the UE context stored in the SGW includes address information (IP address) of the mobility management element that serves the UE, the SGW may retrieve the affected UE according to the address information (IP address) of the mobility management element when the mobility management element is faulty.

In the process of perceiving and determining the two faults above, the SGW may set a fault flag in the context of the UE that is served by the mobility management element before the restart or fault occurs, and record restart success or fault non-recovery information, as detailed below:

A) The SGW sets a mobility management element fault flag in the context of the UE served by the mobility management element, and records mobility management element restart for the UE served by the mobility management element. For example, the fault flag may record "MME/SGSN Restart/Reset" to indicate restart success of the MME/SGSN, or the fault flag may record relevant restart information, with a value "true" indicating restart success of the MME/SGSN; or In the context of the UE served by the mobility management element, the SGW sets a mobility management element TEID to a specific value, for example, sets the MME/SGSN TEID to a null value or all zeros or all 1s, so as to distinguish between different fault scenarios. Here the MME/SGSN TEID may be set to all zeros to indicate restart success of the MME/SGSN.

B) The SGW sets a mobility management element fault flag in the context of the UE served by the mobility management element, and records mobility management element fault non-recovery for the UE served by the mobility management element. For example, "MME/SGSN Failure" for indicating MME/SGSN fault non-recovery may be recorded in the fault flag or relevant fault information may be recorded in the fault flag, with a value "true" indicating MME/SGSN fault non-recovery; or In the context of the UE served by the mobility management element, the SGW sets a mobility management element TEID to a specific value, for example, sets the MME/SGSN TEID to a null value or all zeros or all 1s, so as to distinguish between different fault scenarios. Here the MME/SGSN TEID may be set to all is to indicate MME/SGSN fault non-recovery.

Depending on the fault type determined above, the SGW reselects a mobility management element in the following way:

I. If the mobility management element is restarted successfully,

Scheme 1:

After detecting and determining that the first mobility management element is restarted successfully, the SGW selects the successfully restarted mobility management element (hereinafter referred to as the first mobility management element);

Scheme 2:

After detecting and determining that the first mobility management element is restarted successfully, the SGW sets a fault flag in the context of the UE that is served by the first mobility management element before the restart occurs, and records restart success information, and then, after receiving downlink data from a PGW, the SGW still selects the first mobility management element according to the restart success information recorded by the fault flag.

II. If the mobility management element does not recover from the fault,

Scheme 3:

After detecting and determining that the first mobility management element does not recover from the fault, the SGW reselects a mobility management element (hereinafter referred to as a second mobility management element) in a mobility management element pool that includes the first mobility management element;

Scheme 4:

After detecting and determining that the first mobility management element does not recover from the fault, the SGW sets a fault flag in the context of the UE that is served by the first mobility management element before the fault occurs, and records fault non-recovery information, and then, after receiving downlink data from a PGW, the SGW reselects a mobility management element (the second mobility management element) in the mobility management element pool that includes the first mobility management element according to the fault non-recovery information recorded by the fault flag.

102. The serving gateway sends a downlink data notification message to the reselected mobility management element, whereupon the reselected mobility management element sends a paging message to a user equipment UE that is served by the faulty mobility management element before the fault occurs.

I. If the mobility management element is restarted successfully,

Steps subsequent to Scheme 1 and Scheme 2 include:

The SGW sends a downlink data notification (DL Data Notification) message to the first mobility management element, where the downlink data notification message carries IMSI (International Mobile Subscriber Identification Number, international mobile subscriber identity) information of the UE that is served by the first mobility management element before the restart occurs.

After receiving the downlink data notification message, the first mobility management element sends a paging (Paging) message to the UE, where the paging message carries IMSI information of the UE and a core network domain indicator (CN Domain Indicator) information element, and the CN Domain Indicator is PS;

Scheme 1 and Scheme 2 further include: After receiving the paging message that carries the IMSI information, the UE sends an attach request (Attach Request) message that carries the IMSI information of the UE because the paging message carries the IMSI information of the UE and the CN Domain Indicator information element and because the CN Domain Indicator is PS; if the mobility management element that receives the attach request message and the first mobility management element are the same mobility management element, the attach request message is deemed a paging response message, and the first mobility management element stops paging. If the mobility management element that receives the attach request message (hereinafter referred to as the second mobility management element) and the first mobility management element are different mobility management elements, the second mobility management element that receives the attach request message sends an Update Location Request message to an HSS (Home Subscriber Server, home subscriber server). Because the identifier information (MME1 ID/SGSN1 Number information/SGSN1 IP address information) of the first mobility management element in the HSS does not match the identifier information (MME2 ID/SGSN2 Number information/SGSN2 IP address information) of the second mobility management element, the HSS is triggered to send a cancel location (Cancel Location) message to the first mobility management element, and the first mobility management element stops paging after receiving the Cancel Location message.

II. If the mobility management element does not recover from the fault,

Steps subsequent to Scheme 3 and Scheme 4 include:

The SGW sends a downlink data notification message to the second mobility management element, where the downlink data notification message carries the IMSI information of the UE that is served by the first mobility management element before the fault occurs, and the downlink data notification message further carries an HSS registration initiation indicator information element, or carries the identifier information (MME1 ID/SGSN1 Number information/SGSN1 IP address information) of the first mobility management element, or carries RAT Type (Radio Access Technique Type, radio access technique type) information and PLMN ID (Public Land Mobile Network Identity, public land mobile network identifier) information. The RAT Type information is used to indicate the radio access type (such as E-UTRAN or GERAN or UTRAN) currently selected by the UE, and the PLMN ID information is used to indicate the PLMN identifier information selected by the current UE.

After receiving the downlink data notification message, the second mobility management element sends a registration message such as Update Location Request message or Notify Request message to the HSS, where the registration message carries the IMSI information of the UE and the identifier information (MME2 ID/SGSN2 Number information/SGSN2 IP address information) of the second mobility management element so that the HSS detects the information about the second mobility management element.

After receiving an Update Location Ack message or a Notify Response message from the HSS, the second mobility management element sends a paging message to the UE, where the paging message carries IMSI information of the UE and a CN Domain Indicator information element, and the CN Domain Indicator is PS;

Scheme 3 and Scheme 4 further include: after receiving the paging message that carries the IMSI information, the UE sends an attach request message that carries the IMSI information of the UE because the paging message carries the IMSI information of the UE and the CN Domain Indicator information element and because the CN Domain Indicator is PS; if the mobility management element that receives the attach request message and the second mobility management element are the same mobility management element, the attach request message is deemed a paging response message, and the second mobility management element stops paging. If the mobility management element that receives the attach request message and the second mobility management element are different mobility management elements, the mobility management element that receives the attach request message sends an Update Location Request message to an HSS. Because the identifier information of the second mobility management element in the HSS does not match the identifier information of the mobility management element that receives the attach request message, the HSS is triggered to send a Cancel Location message to the second mobility management element, and the second mobility management element stops paging after receiving the Cancel Location message.

Optionally, the following schemes may be used subsequent to Scheme 3 and Scheme 4, including:

The SGW sends a downlink data notification message to the second mobility management element, where the downlink data notification message carries the IMSI information of the UE that is served by the first mobility management element before the fault occurs, and the paging trigger message further carries an indicator information element or identifier information (MME2 ID/SGSN2 Number information/SGSN2 IP address information) of the second mobility management element, where the information is used to instruct the second mobility management element to send its identifier information to the UE.

The second mobility management element sends a paging message to the UE, where the paging message carries the IMSI information of the UE and a CN Domain Indicator information element, and the CN Domain Indicator is PS; the paging message further carries identifier information of the second mobility management element such as MME2 ID/SGSN2 NRI (Network Resource Indicator, network resource indicator) information, or carries S-TMSI (S-Temporary Mobile Subscriber Identity, S-temporary mobile subscriber identity)/GUTI (Globally Unique Temporary Identity, globally unique temporary identifier) information of the MME2 ID, or carries P-TMSI (Packet Temporary Mobile Subscriber Identity, packet temporary mobile subscriber identity) information of the SGSN2 NRI;

Scheme 3 and Scheme 4 further include: the UE sends the received identifier information of the second mobility management element to a radio access network RAN; because the paging message carries the IMSI information of the UE and the CN Domain Indicator information element and because the CN Domain Indicator is PS, the UE sends an attach request message that carries the IMSI information of the UE to the second mobility management element; and The second mobility management element receives the attach request message and stops paging.

With the paging processing method provided in the embodiment of the present invention, in a scenario where a mobility management element is faulty, an SGW reselects a mobility management element for a UE that is served by the faulty mobility management element before the fault occurs, and triggers the reselected mobility management element to page the UE, which further triggers the UE to initiate an attach process to re-create a context, thereby ensuring user experience.

Figure 2:
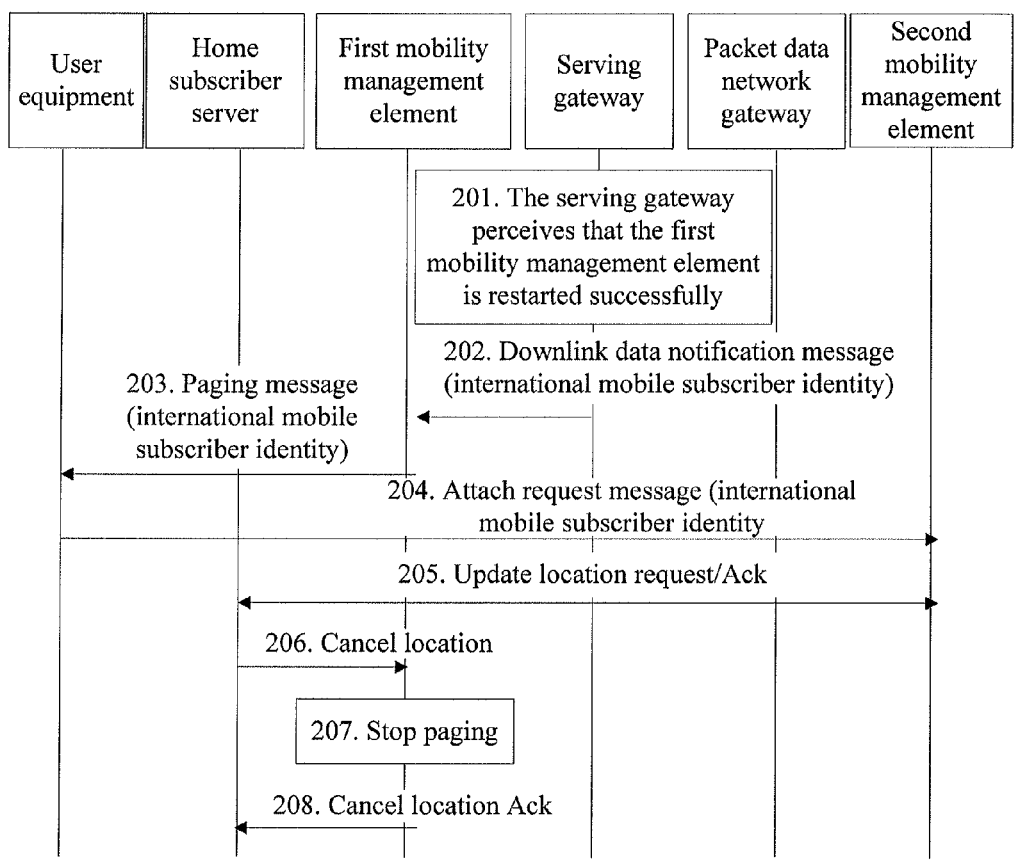
FIG. 2 is a schematic diagram of a paging processing method according to Embodiment 2 of the present invention.

FIG. 2 is a schematic diagram of a paging processing method according to a second embodiment of the present invention. As shown in FIG. 2:

201. The SGW detects and determines that MME1/SGSN1 is restarted successfully.

The SGW sends an Echo Request message to the MME1/SGSN1; after receiving the Echo Request message, the MME1/SGSN1 returns an Echo Response message to the SGW, where the message carries restart counter information; according to the received restart counter information, the SGW detects that the MME1/SGSN1 is restarted successfully; or The MME1/SGSN1 sends an Echo Request message to the SGW when being restarted, where the message carries restart counter information; according to the received restart counter information, the SGW detects that the MME1/SGSN1 is restarted successfully.

At this time, the SGW keeps serving the UE that is served before the MME1/SGSN1 is restarted, without deleting a context of the UE; besides, because the UE context stored in the SGW includes address information (IP address) of the MME1/SGSN1 that serves the UE, the SGW may retrieve the affected UE according to the address information (IP address) of the MME1/SGSN1 when the MME1/SGSN1 is restarted.

In the embodiment, the way of detecting and determining restart success of the MME1/SGSN1 is not limited to the above two manners.

202. The SGW sends a downlink data notification (DL Data Notification) message to the MME1/SGSN1 in order to trigger the MME1/SGSN1 to page the UE.

The SGW determines restart success of the MME1/SGSN1, triggers the SGW to reselect an MME1/SGSN1 to re-create a UE context, and sends a DL Data Notification message to the MME1/SGSN1, where the DL Data Notification message carries IMSI information of the UE.

Because the MME1/SGSN1 is restarted and the context of the UE served by it is lost, the IMSI information is unknown to the MME1/SGSN1; therefore, after receiving the DL Data Notification message that carries the IMSI information of the UE, the MME1/SGSN1 is triggered to send a paging message to the UE, which further triggers the UE to perform an attach process to re-create a UE context.

203. The MME1/SGSN1 sends a paging (Paging) message to the UE, where the paging message carries the IMSI information of the UE.

The Paging message is forwarded to the UE through an eNodeB or an RNC/BSS, as detailed below:

MME1 sends a Paging message to the eNodeB; because the paging message carries the UE IMSI information and the CN Domain Indicator information element that are provided by the SGW, and the CN domain indicator is "PS", the eNodeB pages the UE after receiving the Paging message; or SGSN1 sends a Paging message to the RNC/BSS; because the paging message carries the UE IMSI information and the CN Domain Indicator that are provided by the SGW, and the CN domain indicator is PS, the RNC/BSS pages the UE after receiving the Paging message.

In this step, the MME1/SGSN1 may start a paging state machine, and, if no paging response message (Attach Request or Cancel Location) is received within a period of time, the MME1/SGSN1 may re-send the Paging message.

204. The UE sends an Attach Request message to the MME2/SGSN2.

After the UE receives the Paging message, because the Paging message carries the IMSI information of the UE and the CN Domain Indicator information element, and the CN Domain Indicator is PS, the UE initiates an Attach process. At this time, the UE sends an Attach Request message to the MME2/SGSN2, where the Attach Request message carries the ISMI information of the UE.

The MME2/SGSN2 receives the Attach Request message; in this case, if MME2 and MME1 are the same MME or if SGSN2 and SGSN1 are the same SGSN, the MME1/SGSN1 performs step 207 directly to stop paging; or The MME2/SGSN2 receives the Attach Request message; in this case, if MME2 and MME1 are different MMEs or if SGSN2 and SGSN1 are different SGSNs, the MME2/SGSN2 continues to perform step 205.

205. The MME2/SGSN2 sends an Update Location Request message to the HSS, where the Update Location Request message carries IMSI information of the UE and MME2/SGSN2 identifier information (MME2 ID/SGSN2 Number information/SGSN2 IP address information); and the HSS returns an Update Location Ack message to the MME2/SGSN2.

206. The HSS sends a Cancel Location message to the MME1/SGSN1.

After receiving the MME2/SGSN2 identifier information in step 205, the HSS is triggered to send a Cancel Location message to the MME1/SGSN1 because the HSS stores the identifier information of the MME1/SGSN1, and the identifier information of the MME2/SGSN2 is different from the identifier information of the MME1/SGSN1.

207. The MME1/SGSN1 receives the Cancel Location message and stops paging.

208. The MME1/SGSN1 sends a Cancel Location Ack message.

With the paging processing method provided in the embodiment of the present invention, an SGW reselects a mobility management element for a UE that is served by the faulty mobility management element before the fault occurs, and triggers the reselected mobility management element to page the UE, which further triggers the UE to initiate an attach process to re-create a context, thereby ensuring user experience.

Figure 3:
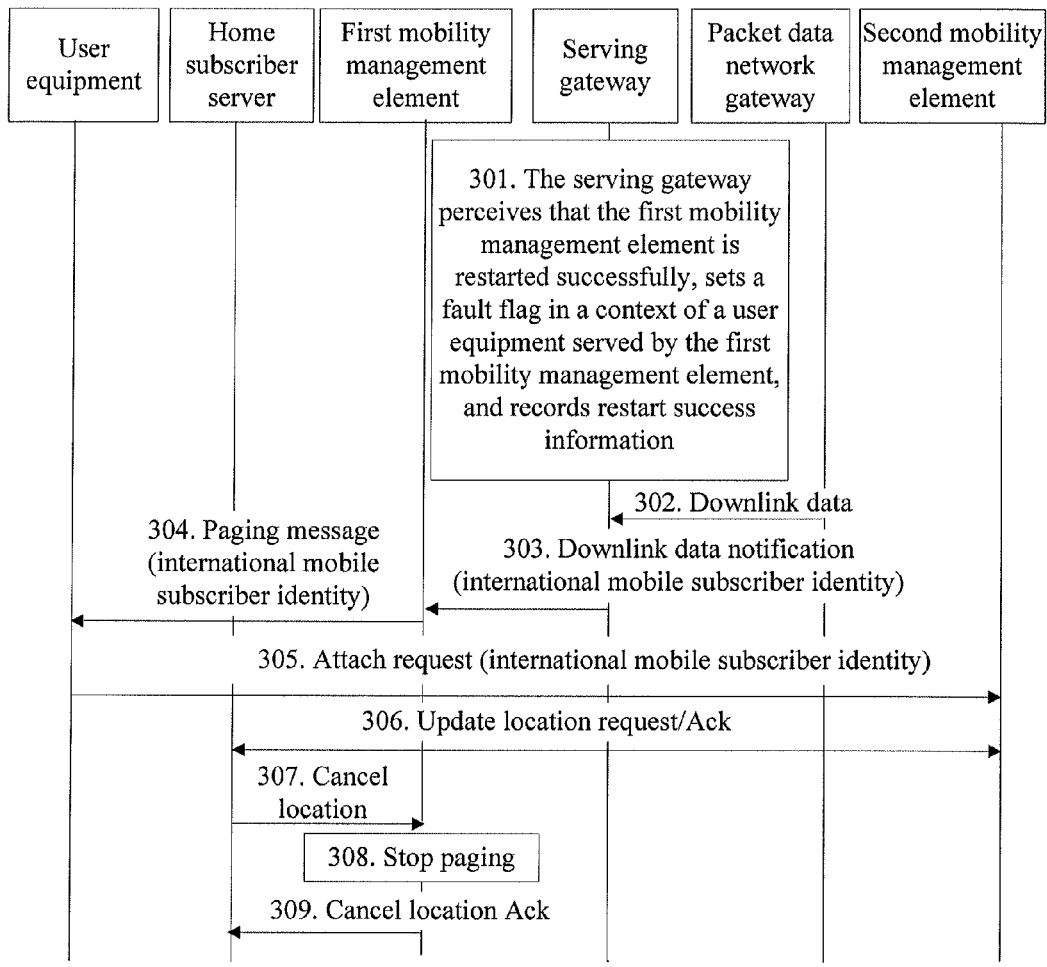
FIG. 3 is a schematic diagram of a paging processing method according to Embodiment 3 of the present invention.

FIG. 3 is a schematic diagram of a paging processing method according to Embodiment 3 of the present invention. As shown in FIG. 3:

301. The SGW detects and determines restart success of MME1/SGSN1, sets a fault flag in a context of a UE that is served by the MME1/SGSN1 before the restart, and records restart success information.

The detailed description about how the SGW detects and determines restart success of the MME1/SGSN1 is exactly the same as step 201 in Embodiment 2. For the detailed description, reference may be made to step 201, which is not detailed any further.

After detecting and determining restart success of the MME1/SGSN1, the SGW sets a fault flag in the context of the UE that is served by the MME1/SGSN1 before the restart, and records restart success information, as detailed below:

1) The SGW sets an MME1/SGSN1 fault flag in the context of the UE served by the MME1/SGSN1, and records MME1/SGSN1 restart for the UE served by the MME1/SGSN1. For example, the fault flag may record "MME1/SGSN1 Restart/Reset" to indicate restart success of the MME/SGSN, or the fault flag may record relevant restart information, with a value "true" indicating restart success of the MME1/SGSN1.

2) In the context of the UE served by the MME1/SGSN1, the SGW sets an MME1/SGSN1 TEID to a specific value, for example, sets the MME1/SGSN1 TEID to a null value or all zeros or all 1s, so as to distinguish between different fault scenarios. Here the MME1/SGSN1 TEID may be set to all zeros to indicate restart success of the MME1/SGSN1.

In the embodiment, the way of detecting and recording restart success of the MME1/SGSN1 is not limited to the above two manners.

302. The SGW receives downlink data from the PGW, and, according to the restart success information recorded in the fault flag, triggers the SGW to reselect an MME1/SGSN1 to re-create an UE context.

303. The detailed description about this step is exactly the same as step 202 in Embodiment 2. For the detailed description, reference may be made to step 201, which is not detailed any further.

304. The detailed description about this step is exactly the same as step 203 in Embodiment 2. For the detailed description, reference may be made to step 201, which is not detailed any further.

305. The detailed description about this step is exactly the same as step 204 in Embodiment 2. For the detailed description, reference may be made to step 201, which is not detailed any further.

306. The detailed description about this step is exactly the same as step 205 in Embodiment 2. For the detailed description, reference may be made to step 201, which is not detailed any further.

307. The detailed description about this step is exactly the same as step 206 in Embodiment 2. For the detailed description, reference may be made to step 201, which is not detailed any further.

308. The detailed description about this step is exactly the same as step 207 in Embodiment 2. For the detailed description, reference may be made to step 201, which is not detailed any further.

309. The detailed description about this step is exactly the same as step 208 in Embodiment 2. For the detailed description, reference may be made to step 201, which is not detailed any further.

With the paging processing method provided in the embodiment of the present invention, an the SGW reselects a mobility management element for a UE served by the faulty mobility management element before the fault occurs, and triggers the reselected mobility management element to page the UE, which further triggers the UE to initiate an attach process to re-create a context, thereby ensuring user experience.

Figure 4:
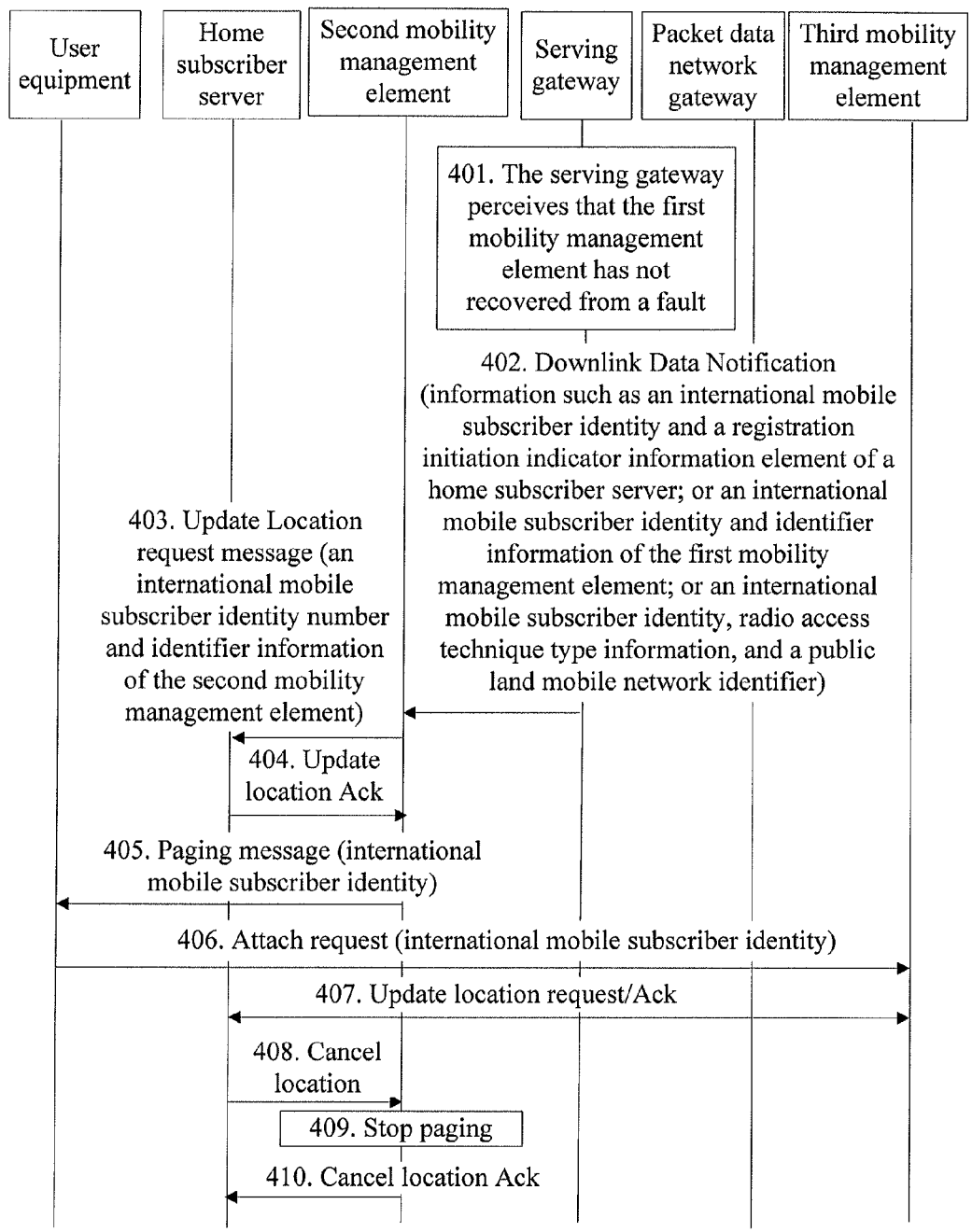
FIG. 4 is a schematic diagram of a paging processing method according to Embodiment 4 of the present invention.

FIG. 4 is a schematic diagram of a paging processing method according to Embodiment 4 of the present invention. As shown in FIG. 4:

401. The SGW detects and determines that MME1/SGSN1 has not recovered from a fault.

The SGW sends an Echo Request message to the MME1/SGSN1, and receives no Echo Response message after a response times out; at this time, the SGW may choose to re-send an Echo Request message to the MME1/SGSN1. If no Echo Response message is received after the sending is repeated several times, the SGW determines that a link to the MME1/SGSN1 is unavailable, that is, the MME1/SGSN1 has not recovered from the fault.

At this time, the SGW keeps serving the UE that is served before the MME1/SGSN1 is faulty, without deleting a context of the UE; besides, because the UE context stored in the SGW includes address information (IP address) of the MME1/SGSN1 that serves the UE, the SGW may retrieve the affected UE according to the address information (IP address) of the MME1/SGSN1 when the MME1/SGSN1 is faulty.

In the embodiment, the way of perceiving and determining the MME1/SGSN1 fault non-recovery is not limited to the above manners.

402. The SGW sends a downlink data notification (DL Data Notification) message to MME2/SGSN2 in order to trigger the MME1/SGSN1 to page the UE.

The SGW determines that the MME1/SGSN1 has not recovered from the fault, triggers the SGW to reselect a mobility management element different from the MME1/SGSN1, that is, reselect MME2/SGSN2, in the MME/SGSN Pool that includes the MME1/SGSN1, and sends a DL Data Notification message to the MME2/SGSN2, where the DL Data Notification message may not only carry the IMSI information of the UE, but may also carry:

an HSS registration initiation indicator information element; or identifier information (MME1 ID/SGSN1 Number information/SGSN1 IP address information) of the MME1/SGSN1; or RAT Type information and PLMN ID information, where the RAT Type information is used to indicate the radio access type currently selected by the UE (for example, E-UTRAN or GERAN or UTRAN), and the PLMN ID information is used to indicate the PLMN identifier information currently selected by the UE.

The information carried in the DL Data Notification message is used to trigger the MME2/SGSN2 to send the message in step 403 to the HSS. Specifically, the MME2/SGSN2 receives the DL Data Notification.

If the message carries an HSS registration initiation indicator information element, step 403 is performed.

If the MME1/SGSN1 information carried in the message does not match the MME2/SGSN2, step 403 is performed.

If the message carries RAT Type information and PLMN ID information, step 403 is performed. Besides, the RAT Type information and the PLMN ID information are mandatory information elements of an Update Location Request message.

403. The MME2/SGSN2 sends a registration message to the HSS, for example, an Update Location Request message or a Notify Request message.

The MME2/SGSN2 sends a registration message to the HSS to register the MME2/SGSN2. Specifically, for example, the registration message is an Update Location Request message or a Notify Request message. The message carries IMSI information of the UE and MME2/SGSN2 identifier information (such as MME2 ID/SGSN2 Number information/SGSN2 IP address information), which makes the HSS detect the MME2/SGSN2 information. This process is known as a process of registering with the HSS. This embodiment does not exclude other messages for registering the MME2/SGSN2 with the HSS.

It should be noted that when the message in step 402 carries RAT Type information and PLMN ID information, the present invention prefers the MME2/SGSN2 to send an Update Location Request message to the HSS, where the Update Location Request message not only carries the IMSI information of the UE and the MME2/SGSN2 information, but also carries the RAT Type information and the PLMN ID information that are obtained through the message in step 402.

404. The MME2/SGSN2 receives the corresponding message from the HSS, for example, an Update Location Ack message or a Notify Response message.

405. The MME2/SGSN2 sends a Paging message to the UE, where the Paging message carries the IMSI information of the UE.

The Paging message is forwarded to the UE through an eNodeB or an RNC/BSS, as detailed below:

MME2 sends a Paging message to the eNodeB; because the paging message carries the UE IMSI information and the CN Domain Indicator information element that are provided by the SGW, and the CN domain indicator is "PS", the eNodeB pages the UE after receiving the Paging message; or SGSN2 sends a Paging message to the RNC/BSS; because the paging message carries the UE IMSI information and the CN domain indicator information element that are provided by the SGW, and the CN domain indicator is "PS", the RNC/BSS pages the UE after receiving the Paging message.

In this step, the MME2/SGSN2 may start a paging state machine, and, if no paging response message (Attach Request or Cancel Location) is received within a period of time, the MME2/SGSN2 may re-send the Paging message.

406. The UE sends an Attach Request message to MME3/SGSN3.

After the UE receives the Paging message, because the Paging message carries the IMSI information of the UE and the CN domain indicator information element, and the CN domain indicator is "PS", the UE initiates an Attach process. At this time, the UE sends an Attach Request message to the MME3/SGSN3, where the Attach Request message carries the ISMI information of the UE.

The MME3/SGSN3 receives the Attach Request message; in this case, if MME3 and MME2 are the same MME or if SGSN3 and SGSN are the same SGSN, the MME2/SGSN2 performs step 409 directly to stop paging; or MME3/SGSN3 receives the Attach Request message; in this case, if MME3 and MME2 are different MMEs or if SGSN3 and SGSN2 are different SGSNs, the MME3/SGSN3 continues to perform step 407.

407. The MME3/SGSN3 sends an Update Location Request message or a Notify Request message to the HSS, where the Update Location Request message or the Notify Request message carries IMSI information of the UE and MME3/SGSN3 identifier information (MME3 ID/SGSN3 Number information/SGSN3 IP address information); and the HSS returns an Update Location Ack message or a Notify Response message to the MME3/SGSN3.

408. The HSS sends a Cancel Location message to the MME2/SGSN2.

After the HSS receives the MME3/SGSN3 identifier information in step 407, because the HSS stores the identifier information of the MME2/SGSN2, and the identifier information of the MME3/SGSN3 is different from the identifier information of the MME2/SGSN2, the HSS is triggered to send a Cancel Location message to the MME2/SGSN2.

409. The MME2/SGSN2 receives the Cancel Location message and stops paging.

410. The MME2/SGSN2 sends a Cancel Location Ack message.

With the paging processing method provided in the embodiment of the present invention, in a scenario where a mobility management element is faulty, an SGW reselects a mobility management element for a UE that is served by the faulty mobility management element before the fault occurs, and triggers the reselected mobility management element to page the UE, which further triggers the UE to initiate an attach process to re-create a context, thereby ensuring user experience.

Figure 5:
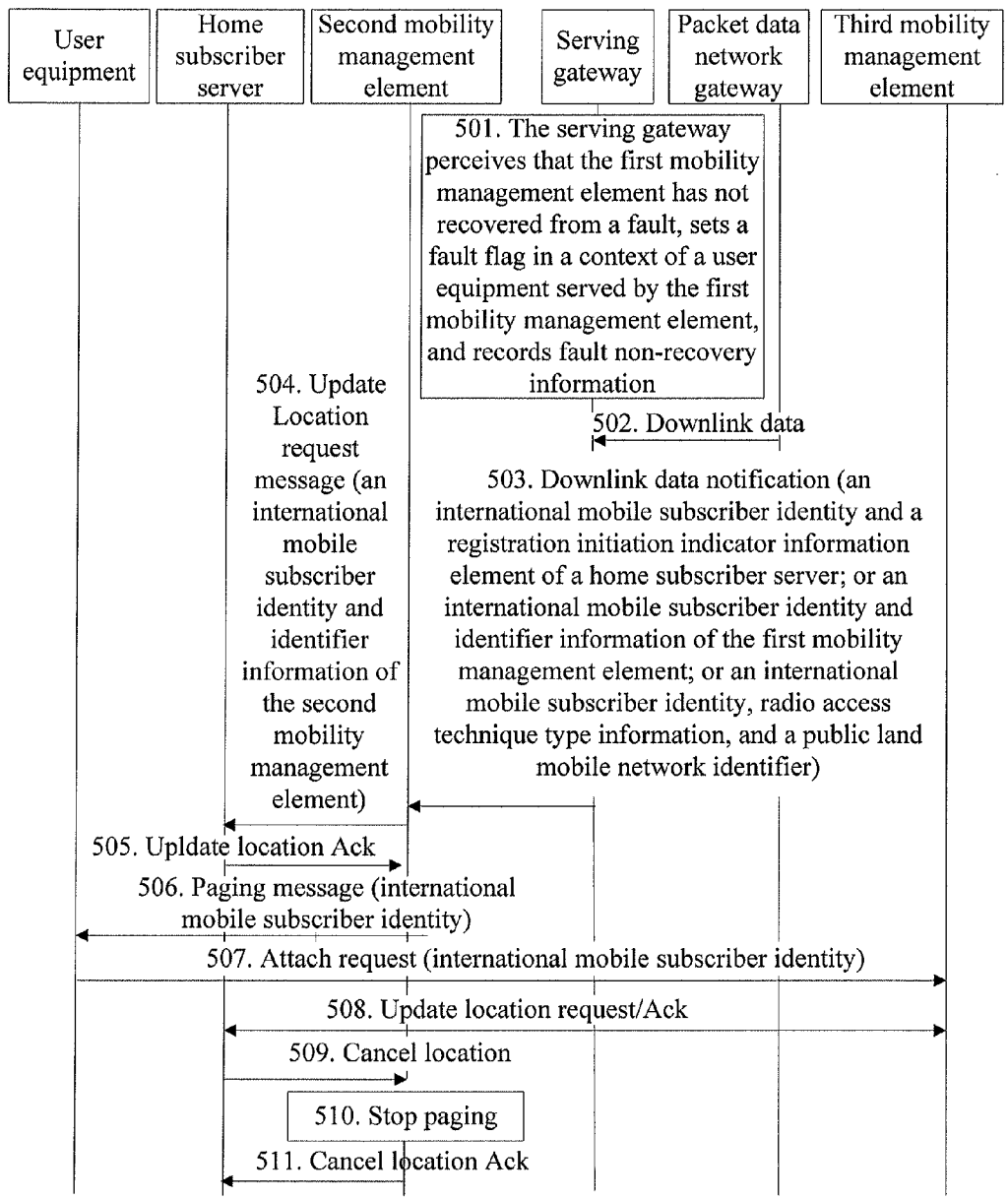
FIG. 5 is a schematic diagram of a paging processing method according to Embodiment 5 of the present invention.

FIG. 5 is a schematic diagram of a paging processing method according to Embodiment 5 of the present invention, as shown in FIG. 5:

501. The SGW detects and determines that MME1/SGSN1 has not recovered from a fault, sets a fault flag in a context of a UE that is served by the MME1/SGSN1 before the fault occurs, and records fault non-recovery information.

The detailed description about how the SGW detects and determines the MME1/SGSN1 fault non-recovery is exactly the same as step 401 in Embodiment 4. For the detailed description, reference may be made to step 401, which is not detailed any further.

After detecting and determining that the MME1/SGSN1 has not recovered from the fault, the SGW sets a fault flag in the context of the UE that is served by the MME1/SGSN1 before the fault occurs, and records the fault non-recovery information, as detailed below:

1) The SGW sets an MME1/SGSN1 fault flag in the context of the UE served by the MME1/SGSN1, and records MME1/SGSN1 fault non-recovery for the UE served by the MME1/SGSN1. For example, the fault flag may record "MME1/SGSN1 Failure" to indicate MME/SGSN fault non-recovery, or the fault flag may record relevant fault information, with a value "true" indicating MME1/SGSN1 fault non-recovery.

2) In the context of the UE served by the MME1/SGSN1, the SGW sets an MME1/SGSN1 TEID to a specific value, for example, sets the MME1/SGSN1 TEID to a null value or all zeros or all 1s, so as to distinguish between different fault scenarios. Here the MME1/SGSN1 TEID may be set to all is to indicate MME1/SGSN1 fault non-recovery.

In the embodiment, the way of perceiving and recording the MME1/SGSN1 fault non-recovery is not limited to the above two manners.

502. The SGW receives downlink data from the PGW, and, according to the fault non-recovery information recorded in the fault flag, triggers the SGW to select a mobility management different from the MME1/SGSN1, that is, MME2/SGSN2, in an MME/SGSN Pool that includes the MME1/SGSN1, so as to re-create an UE context.

503. The detailed description about this step is exactly the same as step 402 in Embodiment 4. For the detailed description, reference may be made to step 402, which is not detailed any further.

504. The detailed description about this step is exactly the same as step 403 in Embodiment 4. For the detailed description, reference may be made to step 403, which is not detailed any further.

505. The detailed description about this step is exactly the same as step 404 in Embodiment 4. For the detailed description, reference may be made to step 404, which is not detailed any further.

506. The detailed description about this step is exactly the same as step 405 in Embodiment 4. For the detailed description, reference may be made to step 405, which is not detailed any further.

507. The detailed description about this step is exactly the same as step 406 in Embodiment 4. For the detailed description, reference may be made to step 406, which is not detailed any further.

508. The detailed description about this step is exactly the same as step 407 in Embodiment 4. For the detailed description, reference may be made to step 407, which is not detailed any further.

509. The detailed description about this step is exactly the same as step 408 in Embodiment 4. For the detailed description, reference may be made to step 408, which is not detailed any further.

510. The detailed description about this step is exactly the same as step 409 in Embodiment 4. For the detailed description, reference may be made to step 409, which is not detailed any further.

511. The detailed description about this step is exactly the same as step 410 in Embodiment 4. For the detailed description, reference may be made to step 410, which is not detailed any further.

With the paging processing method provided in the embodiment of the present invention, in a scenario where a mobility management element is faulty, an SGW reselects a mobility management element for a UE that is served by the faulty mobility management element before the fault occurs, and triggers the reselected mobility management element to page the UE, which further triggers the UE to initiate an attach process to re-create a context, thereby ensuring user experience.

Figure 6:
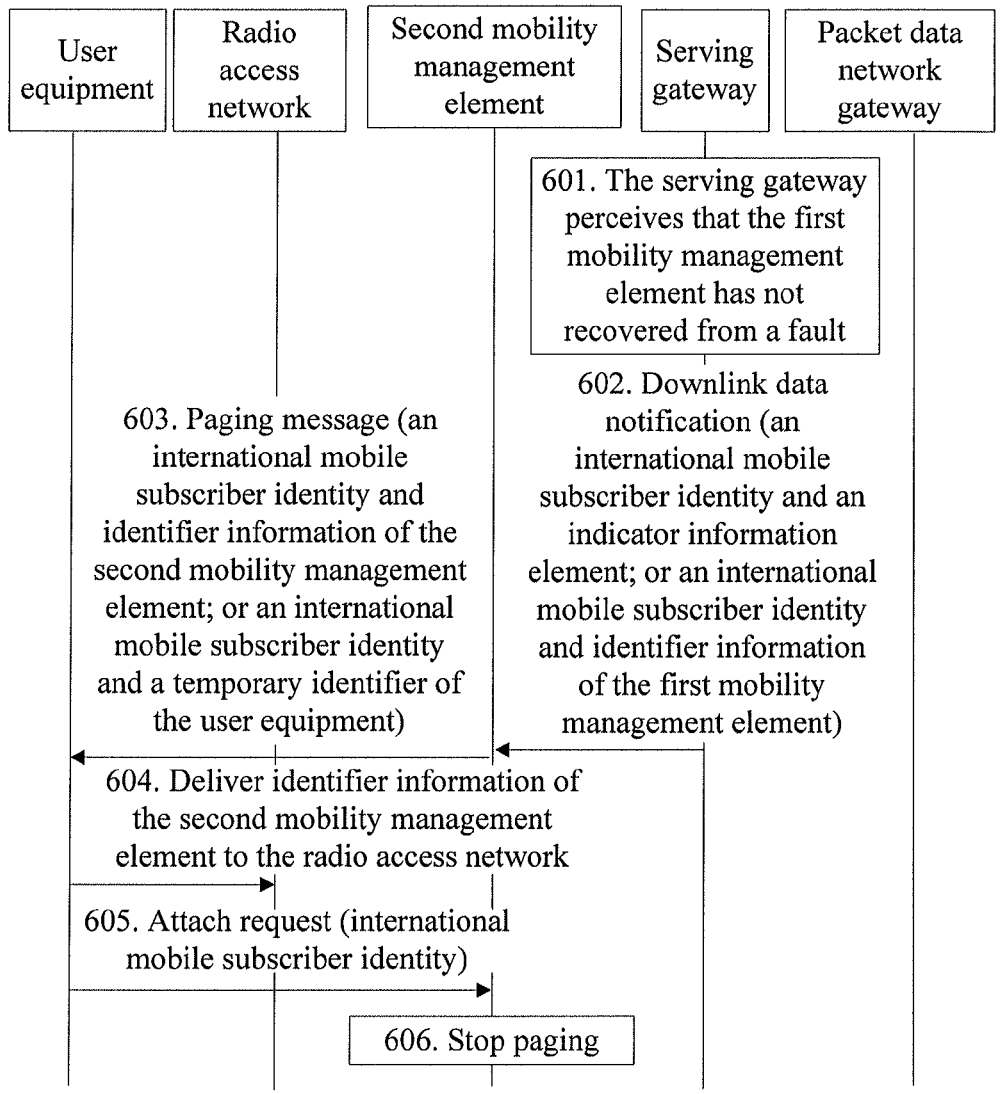
FIG. 6 is a schematic diagram of a paging processing method according to Embodiment 6 of the present invention.

FIG. 6 is a schematic diagram of a paging processing method according to Embodiment 6 of the present invention, as shown in FIG. 6:

601. The SGW detects and determines that MME1/SGSN1 has not recovered from a fault.

The SGW sends an Echo Request message to the MME1/SGSN1, and receives no Echo Response message after a response times out; at this time, the SGW may choose to re-send an Echo Request message to the MME1/SGSN1. If no Echo Response message is received after the sending is repeated several times, the SGW determines that a link to the MME1/SGSN1 is unavailable, that is, the MME1/SGSN1 has not recovered from the fault.

At this time, the SGW keeps serving the UE that was served by the MME1/SGSN1, without deleting a context of the UE; besides, because the UE context stored in the SGW includes address information (IP address) of the MME1/SGSN1 that serves the UE, the SGW may retrieve the affected UE according to the address information (IP address) of the MME1/SGSN1 when the MME1/SGSN1 is restarted.

In the embodiment, the way of perceiving the MME1/SGSN1 fault non-recovery is not limited to the above manners.

602. The SGW sends a DL Data Notification to MME2/SGSN2 in order to trigger the MME2/SGSN2 to page the UE.

The SGW determines that the MME1/SGSN1 has not recovered from the fault, triggers the SGW to reselect a mobility management element different from the MME1/SGSN1, that is, reselect MME2/SGSN2, in the MME/SGSN Pool that includes the MME1/SGSN1, and sends a DL Data Notification message to the MME2/SGSN2, where the DL Data Notification message may not only carry the IMSI information of the UE, but may also carry:

an indicator information element, which is a definite indication for instructing the MME2/SGSN2 to perform step 603 and send its own identifier information to the UE; or identifier information (MME1 ID/SGSN1 Number information/SGSN1 IP address information) of the MME1/SGSN1, where step 603 may be performed if the MME1/SGSN1 information does not match the MME2/SGSN2 information.

Overall, the information carried in the DL Data Notification message is used to trigger the MME2/SGSN2 to send the message in step 603 to the HSS, so as to provide the MME2/SGSN2 information for the UE.

603. The MME2/SGSN2 sends a Paging message to the UE, where the Paging message carries the IMSI information of the UE, a CN domain indicator information element, and MME2/SGSN2 identifier information, and the CN domain indicator is "PS", where the MME2/SGSN2 identifier information may be:

MME2 ID/SGSN2 NRI (Network Resource Indicator, network resource indicator) information; or temporary identifier information S-TMSI/GUTI, where the S-TMSI/GUTI includes the MME2 ID information; or temporary identifier information P-TMSI, where the P-TMSI includes the SGSN2 NRI information.

The Paging message is forwarded to the UE through an eNodeB or an RNC/BSS, as detailed below:

MME2 sends a Paging message to the eNodeB; because the paging message carries the UE IMSI information and the CN Domain Indicator information element that are provided by the SGW, and the CN domain indicator is "PS", the eNodeB pages the UE after receiving the Paging message; or SGSN2 sends a Paging message to the RNC/BSS; because the paging message carries the UE IMSI information provided by the SGW and the CN domain indicator is "PS", the RNC/BSS pages the UE after receiving the Paging message.

604. The UE sends the received MME2 ID and SGSN2 NRI information to the RAN.

The UE delivers the MME2/SGSN2 information to the RAN. For example, the UE delivers the S-TMSI/P-TMSI information received in step 603 to the RAN, where the S-TMSI/P-TMSI information is the MME2/SGSN2 information. The RAN may select the MME2/SGSN2 as a serving network element for the NE according to the MME2/SGSN2 information delivered by the UE, and forward the message, which is sent by the UE to the MME2/SGSN2, to the MME2/SGSN2.

605. The UE sends an Attach Request message to the MME2/SGSN2, where the Attach Request message carries the IMSI information of the UE.

606. The MME2/SGSN2 receives the Attach Request message and stops paging.

With the paging processing method provided in the embodiment of the present invention, in a scenario where a mobility management element is faulty, an SGW reselects a mobility management element for a UE that is served by the faulty mobility management element before the fault occurs, and triggers the reselected mobility management element to page the UE, which further triggers the UE to initiate an attach process to re-create a context, thereby ensuring user experience.

Figure 7:
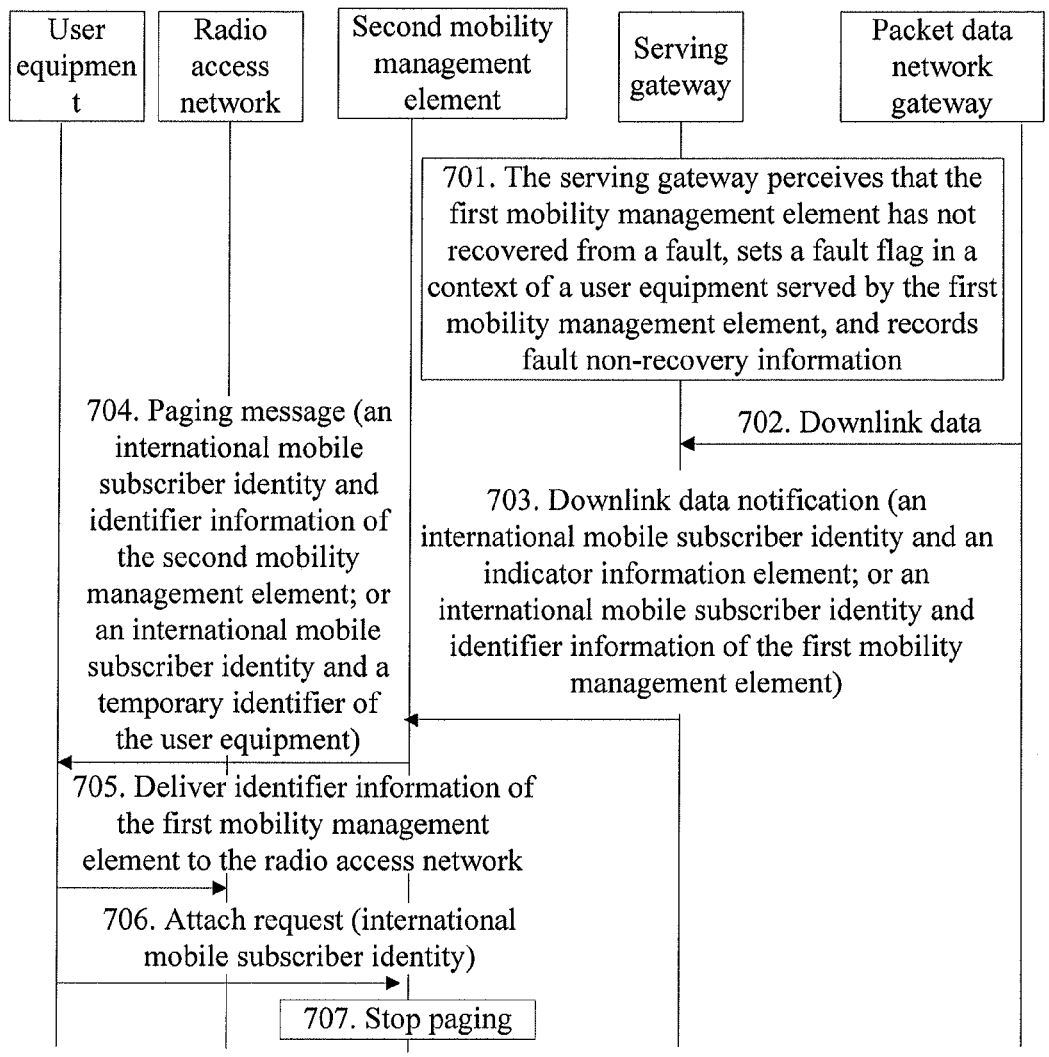
FIG. 7 is a schematic diagram of a paging processing method according to Embodiment 7 of the present invention.

FIG. 7 is a schematic diagram of a paging processing method according to Embodiment 7 of the present invention, as shown in FIG. 7:

701. The SGW detects and determines that MME1/SGSN1 has not recovered from a fault, sets a fault flag in a context of a UE served by the MME1/SGSN1 before the fault occurs, and records fault non-recovery information.

The detailed description about how the SGW detects and determines the MME1/SGSN1 fault non-recovery is exactly the same as step 601 in Embodiment 6. For the detailed description, reference may be made to step 601, which is not detailed any further.

After detecting and determining that the MME1/SGSN1 has not recovered from the fault, the SGW sets a fault flag in the context of the UE that is served by the MME1/SGSN1 before the fault occurs, and records the restart success information, as detailed below:

After perceiving that the MME1/SGSN1 has not recovered from the fault, the SGW sets a fault flag in the context of the UE served by the MME1/SGSN1, and records the fault non-recovery information, as detailed below:

1) The SGW sets an MME1/SGSN1 fault flag in the context of the UE served by the MME1/SGSN1, and records MME1/SGSN1 fault non-recovery for the UE served by the MME1/SGSN1. For example, the fault flag may record "MME1/SGSN1 Failure" to indicate MME/SGSN fault non-recovery, or the fault flag may record relevant fault information, with a value "true" indicating MME1/SGSN1 fault non-recovery; and 2) In the context of the UE served by the MME1/SGSN1, the SGW sets an MME1/SGSN1 TEID to a specific value, for example, sets the MME1/SGSN1 TEID to a null value or all zeros or all 1s, so as to distinguish between different fault scenarios. Here the MME1/SGSN1 TEID may be set to all is to indicate MME1/SGSN1 fault non-recovery.

In the embodiment, the way of perceiving and recording the MME1/SGSN1 fault non-recovery is not limited to the above two manners.

702. The SGW receives downlink data from the PGW, and, according to the fault non-recovery information recorded in the fault flag, triggers the SGW to select a mobility management element different from the MME1/SGSN1, that is, MME2/SGSN2, in an MME/SGSN Pool that includes the MME1/SGSN1, so as to re-create an UE context.

703. The detailed description about this step is exactly the same as step 602 in Embodiment 6. For the detailed description, reference may be made to step 602, which is not detailed any further.

704. The detailed description about this step is exactly the same as step 603 in Embodiment 6. For the detailed description, reference may be made to step 603, which is not detailed any further.

705. The detailed description about this step is exactly the same as step 604 in Embodiment 6. For the detailed description, reference may be made to step 604, which is not detailed any further.

706. The detailed description about this step is exactly the same as step 605 in Embodiment 6. For the detailed description, reference may be made to step 605, which is not detailed any further.

707. The detailed description about this step is exactly the same as step 606 in Embodiment 6. For the detailed description, reference may be made to step 606, which is not detailed any further.

With the paging processing method provided in the embodiment of the present invention, in a scenario where a mobility management element is faulty, an SGW reselects a mobility management element for a UE that is served by the faulty mobility management element before the fault occurs, and triggers the reselected mobility management element to page the UE, which further triggers the UE to initiate an attach process to re-create a context, thereby ensuring user experience.

Figure 8:
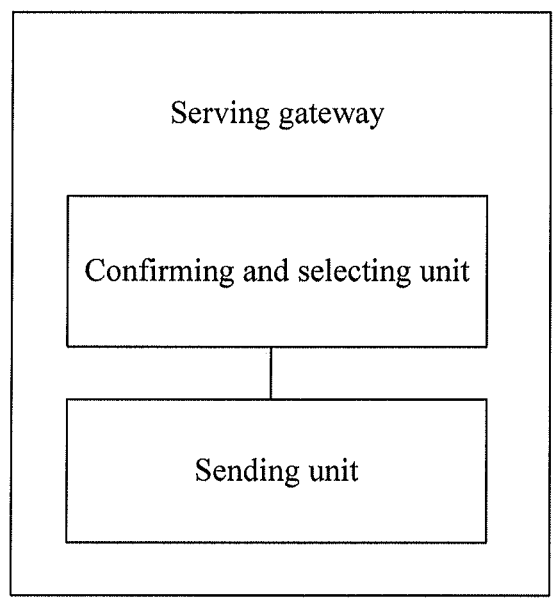
FIG. 8 is a schematic diagram of a serving gateway according to Embodiment 8 of the present invention.

FIG. 8 is a schematic diagram of a serving gateway according to Embodiment 8 of the present invention. As shown in FIG. 8, the serving gateway includes:

a determining and selecting unit, configured to detect a fault of a mobility management element, determine a type of the fault, and reselect a mobility management element according to the type of the fault, where the determining and selecting unit is specifically configured to: detect that the first mobility management element is faulty, determine that the type of the fault is a restart success, and reselect a first mobility management element; or, detect that the first mobility management element is faulty, determine that the type of the fault is fault non-recovery, and reselect a second mobility management element in a mobility management element pool that includes the first mobility management element; and a sending unit, configured to send a downlink data notification message to the reselected mobility management element.

Figure 9:
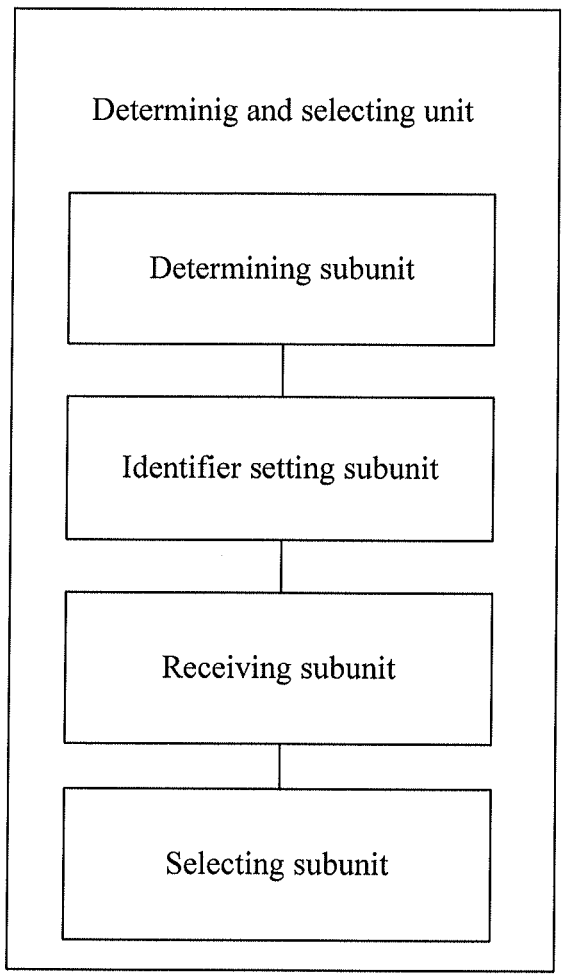
FIG. 9 is a schematic diagram of a determining and selecting unit described in Embodiment 8 of the present invention.

The determining and selecting unit may also be composed of different subunits shown in FIG. 9, as detailed below:

As shown in FIG. 9, the determining and selecting unit further includes:

a determining subunit, configured to detect a fault of the mobility management element, and determine a type of the fault;

an identifier setting subunit, configured to set a fault flag in the context of the UE that is served by the mobility management element before the fault occurs, and record fault type information;

a receiving subunit, configured to receive UE-related downlink data sent by a packet data network gateway; and a selecting subunit, configured to reselect a mobility management element according to the fault type information recorded in the fault flag.

With the serving gateway shown in FIG. 8 and FIG. 9 and provided in the embodiment of the present invention, in a scenario where a mobility management element is faulty, a mobility management element is reselected for a UE that is served by the faulty mobility management element before the fault occurs, and the reselected mobility management element is triggered to page the UE, which further triggers the UE to initiate an attach process to re-create a context, thereby ensuring user experience.

Figure 10:
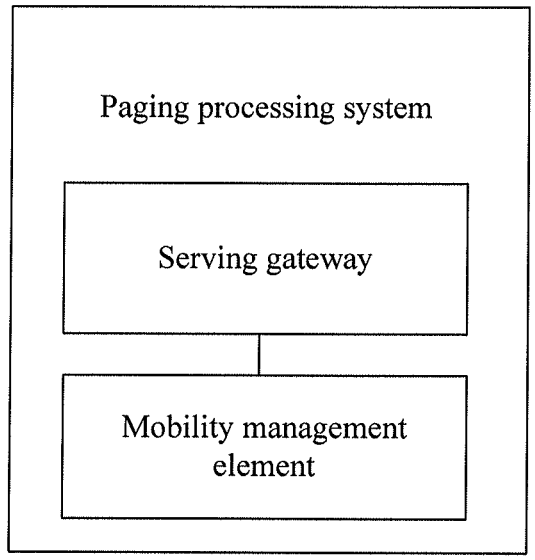
FIG. 10 is a schematic diagram of a paging processing system according to Embodiment 9 of the present invention.

FIG. 10 is a schematic diagram of a paging processing system according to Embodiment 9 of the present invention. As shown in FIG. 10, the paging processing system includes:

a serving gateway, configured to detect a fault of a mobility management element, determine a type of the fault, reselect a mobility management element according to the type of the fault, and send a downlink data notification message to the reselected mobility management element; and a mobility management element, configured to receive the downlink data notification message from the serving gateway, and send a paging message to a UE that is served by the faulty mobility management element before the fault occurs.

1) The serving gateway is specifically configured to:

detect a fault of a first mobility management element, determine a type of the fault as restart success, reselect a first mobility management element, and send a downlink data notification message to the first mobility management element, where the downlink data notification message carries IMSI information of the UE;

or detect a fault of a first mobility management element, and determine a type of the fault as restart success; set a fault flag in a context of the UE that is served by the first mobility management element before the restart occurs, and record restart success information; receive UE-related downlink data sent by a packet data network gateway; reselect a first mobility management element according to restart success information recorded in the fault flag; and send a downlink data notification message to the first mobility management element, where the downlink data notification message carries IMSI information of the UE.

Based on the above description, the mobility management element is specifically configured to receive the downlink data notification message sent by the serving gateway, and send a paging message to the UE that is served by the first mobility management element before the fault occurs.

2) Alternatively, the serving gateway is specifically configured to:

detect a fault of the first mobility management element, determine a type of the fault as fault non-recovery, and select a second mobility management element in a mobility management element pool that includes the first mobility management element; send a downlink data notification message to the second mobility management element, where the downlink data notification message carries IMSI information of the UE, and the downlink data notification message further carries a registration initiation indicator information element of a home subscriber server, or carries identifier information of the first mobility management element, or carries radio access technique type RAT Type information and public land mobile network identifier PLMN ID information, where the above information is used to instruct the second mobility management element to send its own identifier information to the home subscriber server;

or detect a fault of the first mobility management element, and determine a type of the fault as fault non-recovery; set a fault flag in a context of the UE served by the first mobility management element before the fault occurs, and record fault non-recovery information; receive UE-related downlink data sent by a packet data network gateway; select a second mobility management element in a mobility management element pool that includes the first mobility management element according to the fault non-recovery information recorded in the fault flag; send a downlink data notification message to the second mobility management element, where the downlink data notification message carries IMSI information of the UE, and the downlink data notification message further carries a registration initiation indicator information element of a home subscriber server, or carries identifier information of the first mobility management element, or carries radio access technique type RAT Type information and public land mobile network identifier PLMN ID information, where the above information is used to instruct the second mobility management element to send its own identifier information to the home subscriber server.

Based on the above description, the mobility management element is specifically configured to: receive the downlink data notification message sent by the serving gateway, and send a registration message to the home subscriber server, where the registration message carries IMSI of the UE and identifier information of the second mobility management element; and send a paging message to the UE, where the paging message carries the IMSI information of the UE and a core network domain indicator information element, and the core network domain indicator information element indicates a packet switched domain.

3) Alternatively, the serving gateway is specifically configured to:

detect a fault of the first mobility management element, determine a type of the fault as fault non-recovery, and select a second mobility management element in a mobility management element pool that includes the first mobility management element; send a downlink data notification message to the second mobility management element, where the downlink data notification message carries IMSI information of the UE, and the downlink data notification message further carries a indicator information element or identifier information of the first mobility management element, where the information is used to instruct the second mobility management element to send its own identifier information to the UE;

or detect a fault of the first mobility management element, and determine a type of the fault as fault non-recovery; set a fault flag in a context of the UE served by the first mobility management element before the fault occurs, and record fault non-recovery information; receive UE-related downlink data sent by a packet data network gateway; select a second mobility management element in a mobility management element pool that includes the first mobility management element according to the fault non-recovery information recorded in the fault flag; send a downlink data notification message to the second mobility management element, where the downlink data notification message carries IMSI information of the UE, and the downlink data notification message further carries an indicator information element or identifier information of the first mobility management element, where the information is used to instruct the second mobility management element to send its own identifier information to the UE.

Based on the above description, the mobility management element is specifically configured to: receive the downlink data notification message sent by the serving gateway, and send a paging message to the UE, where the paging message carries IMSI information of the UE and a core network domain indicator information element, and the core network domain indicator information element indicates a packet switched domain, and the paging message further carries identifier information of the second mobility management element or temporary identifier information allocated by the second mobility management element to the UE, and the temporary identifier information includes the identifier information of the second mobility management element.

With the paging processing system shown in FIG. 10 and provided in the embodiment of the present invention, in a scenario where a mobility management element is faulty, a mobility management element is reselected for a UE that is served by the faulty mobility management element before the fault occurs, and the reselected mobility management element is triggered to page the UE, which further triggers the UE to initiate an attach process to re-create a context, thereby ensuring user experience.

Figure 11:
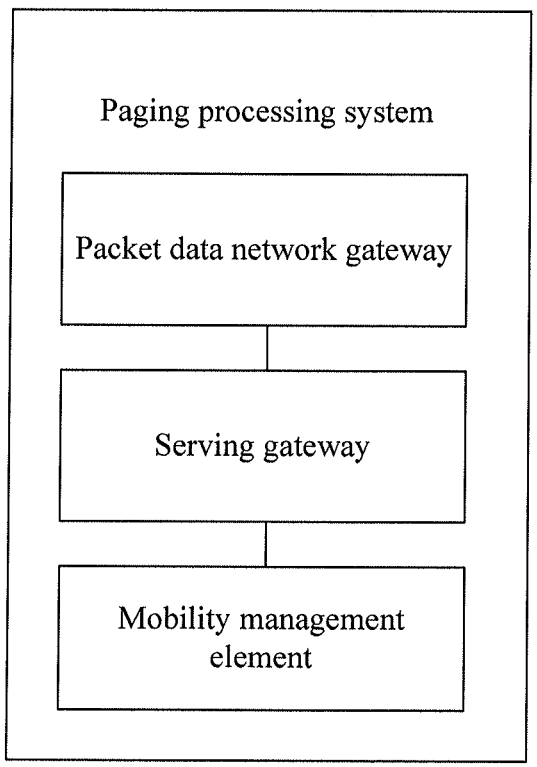
FIG. 11 is a schematic diagram of a paging processing system according to Embodiment 10 of the present invention.

FIG. 11 is a schematic diagram of a paging processing system according to Embodiment 10 of the present invention. As shown in FIG. 11, the paging processing system shown in FIG. 10 further includes:

a packet data network gateway, configured to send downlink data related to the UE to the serving gateway.

With the paging processing system shown in FIG. 11 and provided in the embodiment of the present invention, in a scenario where a mobility management element is faulty, a mobility management element is reselected for a UE that is served by the faulty mobility management element before the fault occurs, and the reselected mobility management element is triggered to page the UE, which further triggers the UE to initiate an attach process to re-create a context, thereby ensuring user experience.

Figure 12:
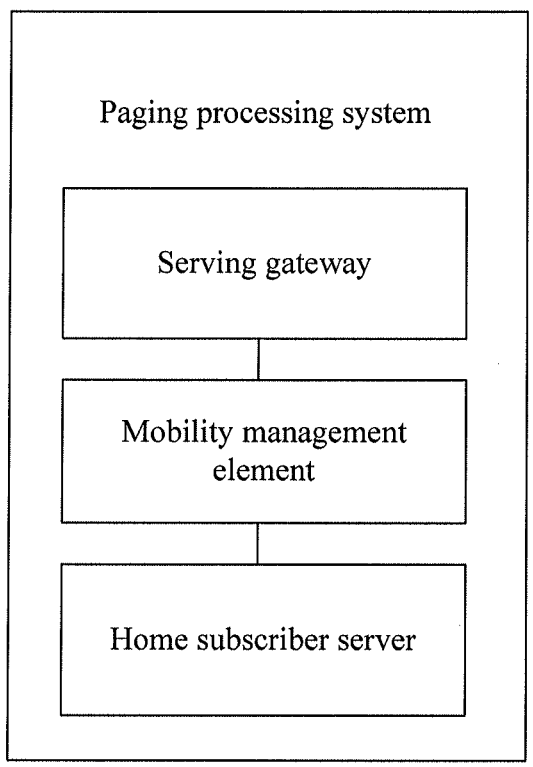
FIG. 12 is a schematic diagram of a paging processing system according to Embodiment 11 of the present invention.

FIG. 12 is a schematic diagram of a paging processing system according to Embodiment 11 of the present invention. As shown in FIG. 12, the paging processing system shown in FIG. 10 further includes:

a home subscriber server, configured to receive a registration message from the mobility management element and store identifier information of the mobility management element.

With the paging processing system shown in FIG. 12 and provided in the embodiment of the present invention, in a scenario where a mobility management element is faulty, a mobility management element is reselected for a UE that is served by the faulty mobility management element before the fault occurs, and the reselected mobility management element is triggered to page the UE, which further triggers the UE to initiate an attach process to re-create a context, thereby ensuring user experience.

Figure 13:
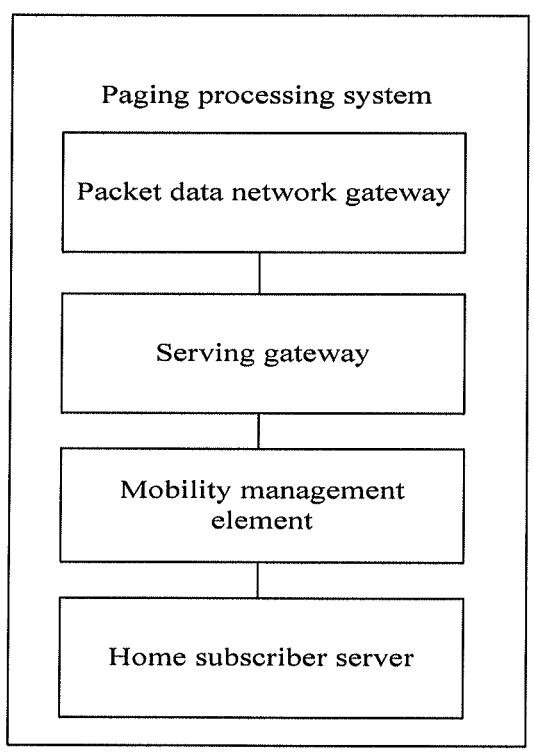
FIG. 13 is a schematic diagram of a paging processing system according to Embodiment 12 of the present invention.

FIG. 13 is a schematic diagram of a paging processing system according to Embodiment 12 of the present invention. As shown in FIG. 13, the paging processing system shown in FIG. 12 further includes:

a packet data network gateway, configured to send downlink data related to the UE to the serving gateway.

With the paging processing system shown in FIG. 13 and provided in the embodiment of the present invention, in a scenario where a mobility management element is faulty, a mobility management element is reselected for a UE that is served by the faulty mobility management element before the fault occurs, and the reselected mobility management element is triggered to page the UE, which further triggers the UE to initiate an attach process to re-create a context, thereby ensuring user experience.

Persons of ordinary skill in the art may understand that all or part of the steps of the methods in the embodiments may be implemented by a program instructing relevant hardware. The program may be stored in a computer readable storage medium. When the program is run, the steps of the foregoing method in the embodiments are performed. The storage medium may be any medium capable of storing program codes, such as ROM, RAM, magnetic disk, or optical disk.

It is apparent that those skilled in the art may make modifications and variations to the invention without departing from the spirit and scope of the invention. The invention is intended to cover the modifications and variations provided that they fall within the scope of protection defined by the following claims or their equivalents.

What is claimed is:

1. A paging processing system, comprising:
   a serving gateway, configured to:
   detect a fault of a first mobility management element, determine a type of the fault as fault non-recovery, select a second mobility management element in a mobility management element pool that comprises the first mobility management element according to a type of the fault; and
   send a downlink data notification message to the second mobility management element, wherein the downlink data notification message carries international mobile subscriber identity (IMSI) information of a user equipment (UE), and the downlink data notification message further carries a registration initiation indicator information element of a home subscriber server, or carries identifier information of the first mobility management element, or carries radio access technique type (RAT Type) information and public land mobile network identifier (PLMN ID) information, wherein the above information is used to instruct the second mobility management element to send its own identifier information to the home subscriber server; and
   the second mobility management element, configured to receive the downlink data notification message from the serving gateway, and send a paging message to the user equipment (UE) that is served by the faulty first mobility management element before the fault occurs.

2. The paging processing system according to claim 1, wherein the serving gateway is specifically configured to:

detect a fault of the first mobility management element, and determine a type of the fault as restart success;
set a fault flag in a context of the UE that is served by the first mobility management element before the restart, and record restart success information;
receive UE-related downlink data sent by a packet data network gateway;
reselect the first mobility management element according to the restart success information recorded in the fault flag; and
send the downlink data notification message to the first mobility management element.

3. The paging processing system according to claim 1, wherein the serving gateway is specifically configured to:
   detect the fault of a first mobility management element, and determine the type of the fault as fault non-recovery;
   set a fault flag in a context of a UE that is served by the first mobility management element before the fault occurs, and record fault non-recovery information;
   receive UE-related downlink data sent by a packet data network gateway;
   select the second mobility management element in a mobility management element pool that comprises the first mobility management element according to the fault non-recovery information recorded in the fault flag; and
   send the downlink data notification message to the second mobility management.

4. The paging processing system according to claim 1, wherein the second mobility management element is specifically configured to:
   receive the downlink data notification message sent by the serving gateway, and send a paging message to the UE, wherein the paging message carries the IMSI information of the UE and a core network domain indicator information element, and the core network domain indicator information element indicates a packet switched domain, and the paging message further carries identifier information of the second mobility management element or temporary identifier information allocated by the second mobility management element to the UE, and the temporary identifier information comprises the identifier information of the second mobility management element.

5. A serving gateway including:
   a processor, which is used to select a second mobility management element from a mobility management element pool which includes at least a first mobility management element and the second mobility management element, wherein the first mobility management element has a non-recovery fault while serving a user equipment (UE); and
   a transmitter, which is used to send a downlink data notification message to the second mobility management element, wherein the downlink data notification message includes paging instructions and identifier instruction information for the second mobility management element to page the UE, and the second mobility management element sends its own identifier information to a home subscriber server,
   wherein the paging instruction information includes an international mobile subscriber identity (IMSI) information of the UE, and
   wherein the identifier instruction information includes at least one of: a registration initiation indicator information element of the home subscriber server, identifier information of the first mobility management element, radio access technique type (RAT Type) information, and public land mobile network identifier (PLMN ID) information.

6. The serving gateway according to claim 5,
wherein the processor is used to detect the fault of the first mobility management element serving the UE, and to identify a type of the fault as the non-recovery fault before the processor selects the second mobility management element.

7. The serving gateway according to claim 6,
wherein the processor is used to identify the type of the fault by setting a fault flag in a context of the UE, and to record non-recovery fault information in the fault flag, and
wherein the processor is used to select the second mobility management element in accordance with the non-recovery fault information recorded in the fault flag.

8. The serving gateway according to claim 5, the serving gateway further comprising:
a receiver, which is used to receive UE-related downlink data from a packet data network gateway before the transmitter sends the downlink date notification message.

9. A serving gateway including:
a processor, which is used to select a second mobility management element from a mobility management element pool which includes at least a first mobility management element and the second mobility management element, wherein the first mobility management element has a non-recovery fault while serving a user equipment (UE); and
a transmitter, which is used to send a downlink data notification message to the second mobility management element, wherein the message including paging instructions and identifier instruction information for the second mobility management element to page the UE, and the second mobility management element sends its own identifier information to the UE,
wherein the paging instruction information includes an international mobile subscriber identity (IMSI) information of the UE, and
wherein the identifier instruction information includes at least one of: an indicator information element indicating the second mobility management element to send its own identifier information, and identifier information of the first mobility management element.

10. The serving gateway according to claim 9, wherein the processor is used to detect the fault of the first mobility management element which serves the UE, and to identify a type of the fault as the non-recovery fault before selecting the second mobility management element.

11. The serving gateway according to claim 10,
wherein the processor is used to identify the type of the fault by setting a fault flag in a context of the UE and to record non-recovery fault information in the fault flag, and
wherein the processor is used to select the second mobility management element in accordance with the non-recovery fault information recorded in the fault flag.

12. The serving gateway according to claim 9, the serving gateway further including:
a receiver, which is used to receive UE-related downlink data from a packet data network gateway before the transmitter sends the downlink data notification message.

13. A mobility management element comprising:
a receiver, which is used to receive a downlink data notification message from a serving gateway, wherein the downlink data notification message is being transmitted by the serving gateway when the serving gateway identifies that another mobility management element serving a user equipment (UE) has a non-recovery fault, wherein the downlink data notification message including paging information for the UE and identifier instruction information; and
a transmitter, which is used to send a paging message to the UE in accordance with the paging information for the UE, and the transmitter sends its own identifier information to a home subscriber server in accordance with the identifier instruction information,
wherein the paging instruction information includes an international mobile subscriber identity (IMSI) information of the UE, and
wherein the identifier instruction information includes at least one of: a registration initiation indicator information element of the home subscriber server, identifier information of the other mobility management element, radio access technique type (RAT Type) information, and public land mobile network identifier (PLMN ID) information.

14. The mobility management element according to claim 13,
wherein the transmitter is used to send a registration message to the home subscriber server, wherein the registration message carrying the IMSI of the UE and identifier information of the mobility management element.

15. The mobility management element according to claim 13,
wherein the paging message includes the IMSI information of the UE and a core network domain indicator information element indicating a packet switched domain.

16. The mobility management element according to claim 15,
wherein the paging message further includes: identifier information of the mobility management element or temporary identifier information allocated by the second mobility management element to the UE.

17. A mobility management element comprising:
a receiver, which is used to receive a downlink data notification message from a serving gateway, wherein the downlink data notification message is being transmitted by the serving gateway when the serving gateway identifies that another mobility management element serving a user equipment (UE) has a non-recovery fault, wherein the downlink data notification message includes paging information for the UE and identifier instruction information; and
a transmitter, which is used to send a paging message to the UE in accordance with the paging information for the UE, and the transmitter sends its own identifier information to the UE in accordance with the identifier instruction information by one of: including its own identifier information in the paging message or including its own identifier information in another message,
wherein the paging instruction information includes an international mobile subscriber identity (IMSI) information of the UE, and
wherein the identifier instruction information includes at least one of: an indicator information element indicating the second mobility management element to send its own identifier information, and identifier information of the other mobility management element.

18. The mobility management element according to claim 17,
wherein the transmitter is used to send a registration message to the home subscriber server, the registration message carrying the IMSI of the UE and identifier information of the mobility management element.

19. The mobility management element according to claim 17,
wherein the paging message includes the IMSI information of the UE and a core network domain indicator information element indicating a packet switched domain.

20. The mobility management element according to claim 19,
wherein the paging message further includes: identifier information of the mobility management element or temporary identifier information allocated by the second mobility management element to the UE.

* * * * *